Patented Sept. 19, 1939

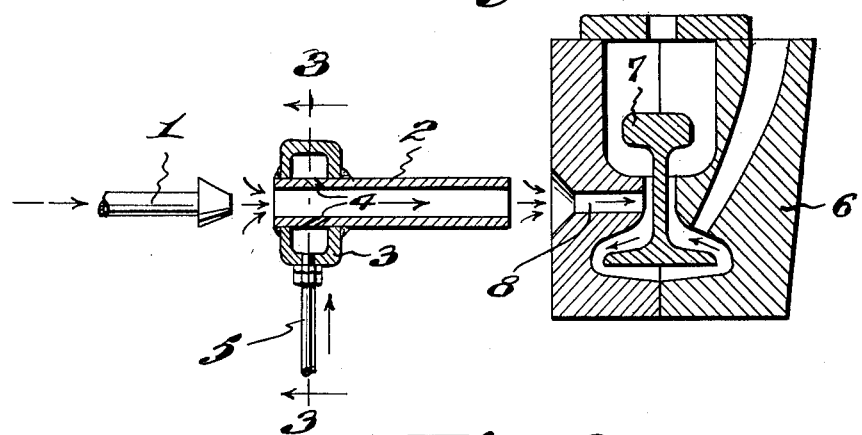
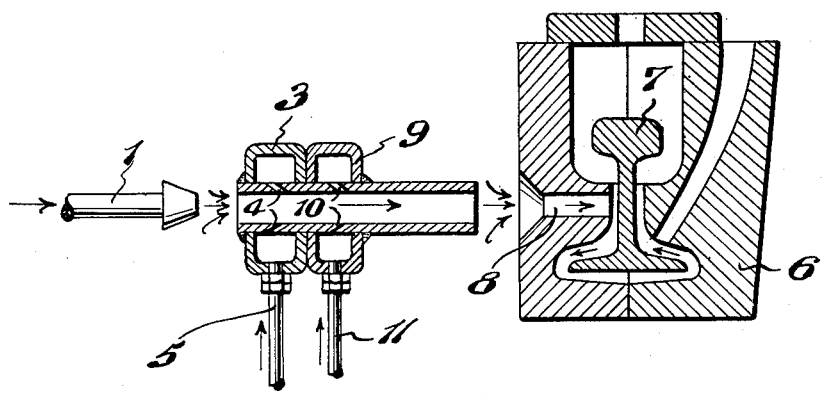
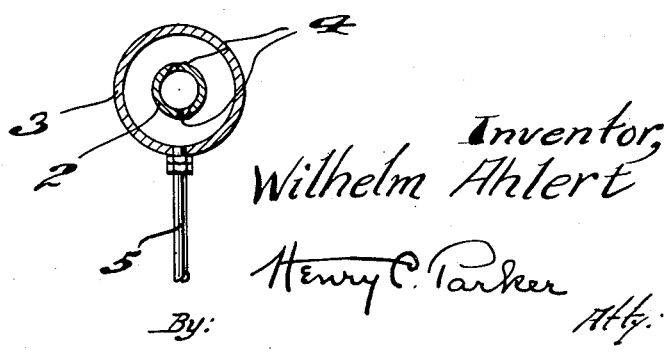

2,173,618

UNITED STATES PATENT OFFICE 2,173,618

PREHEATING APPARATUS AND METHOD

Wilhelm Ahlert, Berlin-Tempelhof, Germany, assignor to Metal & Thermit Corporation, New York, N. Y., a corporation of New Jersey Application June 13, 1939, Serial No. 278,967
In Germany March 27, 1939

16 Claims. (Cl. 22—74)

This invention relates to preheating apparatus and method; and it comprises a method of preheating parts to be welded, such as rails and the like, prior to welding by the aluminothermic process, said process comprising passing a compressed, vaporous fuel into and through a mixing tube under conditions causing the intake and admixture of air, mixing the resulting air-fuel mixture with oxygen or enriched air in said mixing tube, passing the resulting mixture into an enclosure forming a combustion zone surrounding the joint between the parts to be welded under conditions causing additional intake and admixture of air, and burning the resulting mixture in said enclosure, the velocity of said mixture through said tube and into said enclosure being sufficient to cause the entire combustion to take place within said enclosure and to prevent the flame from striking back from said enclosure, said process being modified, if desired, by the introduction of a fuel gas of high combustion temperature, such as hydrogen or acetylene, into the said mixing tube. The apparatus of this invention comprises the combination of an enclosure, forming a combustion zone surrounding the parts to be preheated and provided with a preheating gate, a nozzle connected to a supply of vaporous fuel under pressure, a mixing tube interposed between said nozzle and said preheating gate in such fashion that gaps are left on both sides of said mixing tube, and means for directing a stream of oxygen or enriched air into said mixing tube in such manner as to increase the velocity of the gases in said tube and to produce the intake of air into said tube; all as more fully hereinafter set forth and as claimed.

In the welding of metals by the aluminothermic process it is necessary in most cases to preheat the joint to a cherry red or a bright red heat before the introduction of the aluminothermic charge. This is especially true in the welding of railroad and street railway rails. This preheating is usually accomplished by the use of various types of blow-torches. Owing to the fact that all traffic is interrupted during the welding operation it has long been a desideratum in this art to produce the preheating as quickly as possible. The demand for rapid preheating has been increased owing to the recent introduction of the welding procedure described and claimed in my prior Patent No. 2,150,045 in which the parts to be welded are brought to fusion temperatures at the joint while protected by a heat conducting cap from direct contact with the aluminothermic charge. In this process the joint is usually preheated to higher temperatures than those used previously and the time required to reach these higher temperatures has been correspondingly increased.

In attempting to develop a more rapid preheating method a series of tests were conducted in which compressed gasoline vapors were passed into and through a mixing tube and then into the cavity of a mold surrounding a rail joint. Gaps were left at both sides of the mixing tube and this caused the intake of air at these two points. The gasoline vapors were passed through nozzles of differing diameter and at different pressures but it was found that the minimum time of preheating obtainable with this arrangement was about 20 to 30 minutes. It was found that the preheating time was increased if the diameter of the vapor nozzle was increased beyond 1 mm. or if the pressure of the vapors was increased substantially, this showing that it is impossible to shorten the preheating time solely by increasing the quantity of fuel supplied. It was also found that the preheating time could not be substantially reduced solely by increasing the volume or quantity of the air-fuel mixture. During these tests it was found that best results were obtained by conducting the preheating in such fashion that the entire combustion took place within the confines of the mold cavity, that is, by passing the mixture of vapors and air into the mold cavity with a velocity above the velocity of flame propagation in order to prevent the flame from striking back.

Tests were then made in which oxygen or enriched air was added to the fuel. It was found in these tests that best results were obtained when the oxygen or enriched air was introduced under pressure at the forward end of the mixing tube through jets directed towards the rear end of the tube in such fashion that the velocity of the mixture in the mixing tube was increased and that additional air was drawn in owing to the aspirator effect of the oxygen jets. The most convenient apparatus for introducing the oxygen or enriched air was found to consist of an annular chamber constructed about the forward end of the mixing tube, this chamber connecting with a source of oxygen or enriched air under pressure and with a series of holes drilled at an angle into the mixing tube. It was found that, if these holes were drilled helically, the mixture in the tube was caused to rotate and somewhat better mixing was accomplished. With this arrangement of apparatus and employing oxygen under pressure, it was found that the heating period could be reduced to about one-third of the minimum value obtained previously, that is to a value of from 8 to 10 minutes in comparison with prior values of 20 to 30 minutes.

In further tests to decrease the heating period still further it was found that if a gas having a high heat of combustion, such as hydrogen, methane or acetylene, was introduced into the mixing tube in addition to the oxygen and vaporous fuel, the preheating period could be reduced by an additional 2 to 3 minutes. It was found best to introduce this additional gaseous fuel into the mixing tube after the introduction of the oxygen and this was accomplished by means of a second annular chamber constructed around the forward end of the mixing tube. This chamber communicated with a source of gas under pressure and was provided with a series of vents or ducts passing through the wall of the mixing tube, these vents being directed towards the rear end of the mixing tube in order to increase the velocity of the gaseous mixture through this tube. It was found that the vaporous fuel could not be dispensed with entirely owing to the fact that the velocity of flame propagation of the oxygen-gas mixture was so high that the flame tended to strike back. The quantities of vaporous fuel and of gaseous fuel were therefore proportioned in such fashion that the velocity of flame propagation of the mixture was sufficiently low to prevent striking back and to cause the entire combustion to take place within the mold cavity.

My invention may be described somewhat more specifically by reference to the accompanying drawing which shows, more or less diagrammatically, an assembly of apparatus elements within the purview of this invention and with which my process can be conducted. In this showing, Fig. 1 is a vertical section of a simple form of preheating device in combination with a rail joint and mold also shown in section, Fig. 2 is a similar showing of a somewhat more complicated preheating device, while Fig. 3 is a section through the preheating device taken along the line 3—3 of Fig. 1.

In the various views of the drawing like elements are designated by like reference numerals. Referring more particularly to Fig. 1, a nozzle 1 is shown for supplying gas or vaporous fuel to the preheating device which comprises a mixing tube 2 and an annular chamber 3 which communicates with the interior of the tube by means of the ducts or vents 4 and which supplies oxygen or enriched air to the mixing tube, the oxygen or enriched air being introduced into chamber 3 by means of the pipe 5. The mold 6 which surrounds the rail 7 at the joint to be welded is of the conventional type provided with the usual preheating gate 8. In the equipment shown in Fig. 2 an additional chamber 9 is supplied, communicating with the interior of the mixing tube by means of the vents 10. And this chamber is connected with a supply of fuel, such as acetylene or other gas by means of the pipe 11.

In Fig. 3 a section through the chamber 3 and mixing tube 2 is shown. The vents 4, as shown in this figure, may be directed at an angle to the axis of the mixing tube, if desired, so that the oxygen or enriched air is directed from the chamber 3 substantially tangentially into the mixing tube. This produces a swirling or rotary motion in the mixing tube resulting in better mixing. The vents 10, leading from the fuel chamber 9 into the mixing tube may be disposed in a similar manner to the vents 4, if desired. It is usually not necessary to produce a swirling motion in the mixing tube, however, for the reason that the mixture produced in this tube passes through a gap and then through the preheating gate 8 of the mold, sufficient mixing taking place during this passage.

It will be noted from the figures that the nozzle 1, the mixing tube 2 and the preheating gate 8 are spaced some distance apart, leaving gaps, in order that air may be drawn in and mixed with the fuel before the fuel mixture is ignited. This admixture of air reduces the amount of oxygen required and contributes to the efficiency of the preheating.

The fuel which is introduced into the mouth of the mixing tube in my process can be produced in various ways. Probably the most convenient method is to provide a tank containing a liquid fuel, such as gasoline, benzene, pentane or the like, this tank being maintained under pressure. An inert gas can be used to supply the pressure if desired. The fuel may be withdrawn from this tank through a pipe which includes a heating and vaporizing coil which may be heated by various methods, the resulting vapors then being conducted to a fuel nozzle of the desired dimensions. Of course other vaporous and gaseous fuels having a high ignition point and a low velocity of flame propagation can be employed.

The gaseous fuel used in my process may be of various types but this fuel should have a temperature of combustion above that of the fuel introduced at the mouth of the mixing tube. Hydrogen, methane, ethylene, acetylene or mixtures of these can be used, for example. These fuels in general have too high a velocity of flame propagation to be used alone.

The oxygen-containing gas introduced into the mixing tube may be either pure oxygen or enriched air. It must contain substantial quantities of oxygen, such as 30 per cent or more, in order to produce the desired effect. It is possible to introduce this oxygen-containing gas into the mouth of the mixing tube, if desired, by providing a series of nozzles spaced about the fuel nozzle 1, but it is more convenient to employ an annular chamber mounted on the forward end of the mixing tube as shown in the drawing.

While I have described what I consider to be the best embodiments of my process and apparatus it is evident that various details can be varied without departing from the purview of this invention. The size and shape of my mixing tube can be varied. For example a tube having the shape of a Venturi nozzle has some advantages although being more expensive. When two fuels are employed either can be introduced through the fuel nozzle 1, the other being introduced into the mixing tube as described. The size of my entire apparatus may be varied in accordance with the size of the parts to be preheated. Various gaseous and vaporous fuels may be employed of the types described. And various ways of introducing these fuels into the mixing tube may be employed. Other modifications of this invention which fall within the scope of the following claims will be immediately evident to those skilled in this art.

What I claim is:

1. In the preheating of parts to be welded, the process which comprises passing a vaporous fuel at high velocity into and through a mixing zone under conditions causing the intake and admixture of air, passing an oxygen-containing gas, selected from a group consisting of oxygen and enriched air, into the forward end of said mixing zone in such fashion as to increase the velocity of the gases in said zone and increase the intake of air. then passing the resulting mixture through a gap where additional admixture of air takes place and into a combustion zone surrounding the parts to be welded, the velocity of flow through said mixing tube being sufficient to cause the entire combustion to take place in said combustion zone and to prevent the flame from striking back.

2. In the preheating of parts to be welded, the process which comprises passing a fuel having a high ignition temperature and a low velocity of flame propagation into and through a mixing zone under conditions causing the intake and admixture of air, passing a gas containing a substantial quantity of oxygen into a forward section of said mixing zone in such fashion as to increase the velocity of the gases in said zone and increased intake of air, introducing a gaseous fuel into said mixing zone having a higher velocity of flame propagation and temperature of combustion than said first named fuel, and passing the resulting mixture into a combustion zone surrounding the parts to be welded at a velocity sufficient to cause all combustion to take place in said combustion zone and to prevent the flame from striking back.

3. The process of claim 2 wherein the said fuels are employed in proportions producing a resulting velocity of flame propagation below the velocity of said gases, whereby striking back of the flame is prevented.

4. The process of claim 2 wherein said first named fuel is the vapor of a normally liquid fuel.

5. The process of claim 2 wherein said gaseous fuel is selected from a class consisting of hydrogen, methane, ethylene, acetylene and mixtures thereof.

6. In the process of preheating parts to be welded wherein a mold having a mold cavity and a preheating gate is constructed around said parts and wherein a vaporized fuel is passed at high velocity from a fuel nozzle into and through a mixing tube and then into said preheating gate, gaps being provided at both ends of said mixing tube for the intake and admixture of air, the improvement which comprises introducing a gas containing at least 30 per cent of oxygen at the forward end of said mixing tube in jets directed towards the rear end of said mixing tube in such manner that the velocity of the gaseous mixture passing through said tube is increased, whereby additional intake of air is produced, the fuel mixture passing through said tube at a sufficiently high velocity to cause the entire combustion to take place in said mold cavity and to prevent the flame from striking back.

7. The process of claim 6 wherein said oxygen-containing gas is introduced into said mixing tube at an angle to the axis of said tube, whereby a swirling motion of the gases within said tube is produced.

8. In the process of preheating parts to be welded wherein a mold having a mold cavity and a preheating gate is constructed around said parts and wherein a vaporized fuel is passed at high velocity from a fuel nozzle into and through a mixing tube and then into said preheating gate, gaps being provided at both ends of said mixing tube for the intake and admixture of air, the improvements which comprises introducing an oxygen-containing gas selected from a group consisting of oxygen and enriched air into the forward end of said mixing tube in jets directed towards the rear end of said tube in such manner that the velocity of the gaseous mixture passing through said tube is increased, whereby additional intake of air is produced, and introducing a gaseous fuel having a combustion temperature higher than that of said vaporized fuel into said mixing tube, the proportions of gaseous and vaporous fuels and the velocity of the gases through said mixing tube being such that the entire combustion takes place in said mold cavity and the flame is prevented from striking back.

9. The process of claim 8 wherein the gaseous fuel is introduced into said mixing zone subsequently to the introduction of said oxygen-containing gas.

10. A preheating apparatus for parts to be welded, comprising the combination of a mold having a mold cavity surrounding the parts to be welded at the joint, said mold cavity being provided with a preheating gate, a nozzle connected to a supply of vaporous fuel under pressure, a mixing tube interposed between said nozzle and said preheating gate in such fashion that gaps for the intake of air are provided at both ends of said mixing tube, and means for introducing an oxygen-containing gas into the forward end of said mixing tube in such fashion as to increase the velocity of the gases in said tube and to produce additional intake of air into said tube.

11. The apparatus of claim 10 wherein said means for introducing an oxygen-containing gas comprises an annular chamber mounted at the forward end of said mixing tube connected with a supply of said gas and with ducts leading into said mixing tube.

12. The apparatus of claim 10 wherein said means for introducing an oxygen-containing gas comprises ducts passing through the wall of said mixing tube at an angle to the axis of said tube and directed toward the rear end of said tube, whereby a swirling motion of the gases is produced in said tube.

13. A preheating apparatus for parts to be welded comprising the combination of a mold having a mold cavity surrounding the parts to be welded at the joint, said mold cavity being provided with a preheating gate, a nozzle connected to a supply of vaporous fuel under pressure, a mixing tube interposed between said nozzle and said preheating gate in such fashion that gaps for the intake of air are provided at both ends of said mixing tube, means for introducing an oxygen-containing gas into the forward end of said mixing tube in such fashion as to increase the velocity of the gases in said tube and to produce additional intake of air, and means for introducing an auxiliary gaseous fuel into said mixing tube at the forward end of said mixing tube.

14. The apparatus of claim 13 wherein said means for introducing an oxygen-containing gas and said means for introducing an auxiliary gaseous fuel comprise annular chambers mounted on the forward end of said mixing tube, said chambers being connected with supplies of said gas and said gaseous fuel, respectively, and provided with ducts leading into said mixing tube.

15. The apparatus of claim 13 wherein said means for introducing an oxygen-containing gas and said means for introducing an auxiliary gaseous fuel comprise annular chambers mounted on the forward end of said mixing tube, said chambers being connected with supplies of said gas and said gaseous fuel, respectively, and provided with ducts leading into said mixing tube, and wherein the annular fuel chamber is mounted at the rear of said oxygen-containing gas chamber.

16. The apparatus of claim 13 wherein said means for introducing an oxygen-containing gas comprises ducts passing through the wall of said mixing tube at an angle to the axis of said tube and directed toward the rear end of said tube, whereby a swirling motion of the gases is produced in said tube.

WILHELM AHLERT.